(12) United States Patent
Wu et al.

(10) Patent No.: US 11,211,978 B2
(45) Date of Patent: Dec. 28, 2021

(54) PRECODING CONFIGURATION

(71) Applicant: QUALCOMM Incorporated, San Diego, CA (US)

(72) Inventors: Liangming Wu, Beijing (CN); Yu Zhang, Beijing (CN); Chao Wei, Beijing (CN); Qiaoyu Li, Beijing (CN); Chenxi Hao, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/964,519

(22) PCT Filed: Jan. 25, 2019

(86) PCT No.: PCT/CN2019/073177
§ 371 (c)(1),
(2) Date: Jul. 23, 2020

(87) PCT Pub. No.: WO2019/144929
PCT Pub. Date: Aug. 1, 2019

(65) Prior Publication Data
US 2021/0036745 A1 Feb. 4, 2021

(30) Foreign Application Priority Data
Jan. 26, 2018 (WO) ................ PCT/CN2018/074309

(51) Int. Cl.
*H04B 7/04* (2017.01)
*H04B 7/0456* (2017.01)
*H04B 7/06* (2006.01)

(52) U.S. Cl.
CPC ......... *H04B 7/0456* (2013.01); *H04B 7/0634* (2013.01)

(58) Field of Classification Search
CPC .. H04B 7/0413; H04B 7/0452; H04B 7/0456; H04B 7/046; H04B 7/0473;
(Continued)

(56) References Cited

U.S. PATENT DOCUMENTS 8,825,094 B2 * 9/2014 Haustein .............. H04B 7/0469
455/500
9,450,658 B1 9/2016 Moon et al.
(Continued)

FOREIGN PATENT DOCUMENTS

| CN | 102368698 A | 3/2012 |
|---|---|---|
| CN | 102461010 A | 5/2012 |

(Continued)

OTHER PUBLICATIONS

Huawei: "The Remaining Issues for Type II Codebook", R1-1710454, 3GPP TSG RAN WG1 NR Ad-hoc Meeting, URL: http://www.3gpp.org/ftp/tsg_ran/WG1_RL1/TSGR1_AH/NR_AH_1706/Docs/ Jun. 17, 2017(Jun. 17, 2017), 7 Pages.
(Continued)

*Primary Examiner* — Siu M Lee
(74) *Attorney, Agent, or Firm* — Harrity & Harrity, LLP

(57) ABSTRACT

Various aspects of the present disclosure generally relate to wireless communication. In some aspects, a user equipment (UE) may receive, configuration information indicating that the UE is to compress a precoding matrix indicator in connection with channel state information reporting, wherein the precoding matrix indicator is to be compressed based at least in part on a quantization dependency between transmission layers or an orthogonality relationship between the transmission layers, and wherein the configuration information is associated with a type II, higher rank codebook for multiple input multiple output configuration. The UE may transmit, to a base station (BS), the compressed precoding
(Continued)

matrix indicator to the base station based at least in part on receiving the configuration information. The UE and BS may use a communication configuration based at least in part on a precoding matrix indicator recovered from the compressed precoding matrix indicator. Numerous other aspects are provided.

55 Claims, 10 Drawing Sheets

(58) Field of Classification Search
CPC .. H04B 7/0478; H04B 7/04876; H04B 7/063; H04B 7/0632; H04B 7/0634; H04B 7/0636; H04B 7/0639; H04B 7/0658; H04B 7/0663
See application file for complete search history.

(56) References Cited

U.S. PATENT DOCUMENTS

| | | | |
|---|---|---|---|
| 10,727,909 B2 * | 7/2020 | Xu | H04B 7/0417 |
| 10,868,602 B2 * | 12/2020 | Song | H04B 7/0695 |
| 10,879,973 B2 * | 12/2020 | Song | H04B 7/0695 |
| 2009/0046569 A1 | 2/2009 | Chen et al. | |
| 2010/0265841 A1 | 10/2010 | Rong et al. | |
| 2014/0286267 A1 | 9/2014 | Hui et al. | |
| 2016/0337056 A1 | 11/2016 | Frenne et al. | |

FOREIGN PATENT DOCUMENTS

| | | |
|---|---|---|
| CN | 102792604 A | 11/2012 |
| CN | 102960017 A | 3/2013 |
| CN | 106664128 A | 5/2017 |
| EP | 2834932 A1 | 2/2015 |
| EP | 3070854 A2 | 9/2016 |
| WO | 2014048189 A1 | 4/2014 |
| WO | 2014204396 A1 | 12/2014 |

OTHER PUBLICATIONS

International Search Report and Written Opinion—PCT/CN2018/074309—ISA/EPO—dated Sep. 28, 2018.
International Search Report and Written Opinion—PCT/CN2019/073177—ISA/EPO—dated Apr. 3, 2019.
Nokia, et al., Codebook Subset Restriction Configuration for Type II Codebook 3GPP TSG RAN WG1 Meeting NR #3, R1-1716504, Sep. 21, 2017.
Motorola Mobility., et al., "Discussion on Higher Rank Type II Codebook and Feedback Overhead Reduction", 3GPP TSG RAN WG1 #91, 3GPP Draft, R1-1720924, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017 (Nov. 18, 2017), pp. 1-6, XP051370302, Retrieved from the Internet URL: https://www.3gpp.org/ftp/TSG_RAN/WG1_RL1/TSGR1_91/Docs, [retrieved on Nov. 18, 2017], Sections 2. 4.
Supplementary Partial European Search Report—EP19743319—Search Authority—Munich—dated Sep. 10, 2021.

* cited by examiner

PRECODING CONFIGURATION

CROSS-REFERENCE TO RELATED APPLICATIONS

This application is a 371 national stage of PCT Application No. PCT/CN2019/073177 filed on Jan. 25, 2019, entitled "PRECODING CONFIGURATION," which claims priority to Patent Cooperation Treaty Patent Application No. PCT/CN2018/074309, filed on Jan. 26, 2018, entitled "TECHNIQUES AND APPARATUSES FOR PRECODING CONFIGURATION," which are hereby expressly incorporated by reference herein.

FIELD OF THE DISCLOSURE

Aspects of the present disclosure generally relate to wireless communication, and more particularly to techniques and apparatuses for precoding configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication may include receiving a compressed precoding matrix indicator from a user equipment. The method may include decompressing the compressed precoding matrix indicator to recover a precoding matrix indicator, wherein the compressed precoding matrix indicator is decompressed based at least in part on a quantization dependency between transmission layers or an orthogonality relationship between the transmission layers. The method may include communicating with the user equipment based at least in part on the precoding matrix indicator.

In some aspects, a base station for wireless communication may include memory and one or more processors coupled to the memory. The memory and the one or more processors may be configured to receive a compressed precoding matrix indicator from a user equipment. The memory and the one or more processors may be configured to decompress the compressed precoding matrix indicator to recover a precoding matrix indicator, wherein the compressed precoding matrix indicator is decompressed based at least in part on a quantization dependency between transmission layers or an orthogonality relationship between the transmission layers. The memory and the one or more processors may be configured to communicate with the user equipment based at least in part on the precoding matrix indicator.

In some aspects, a non-transitory computer-readable medium may store one or more instructions for wireless communication. The one or more instructions, when executed by one or more processors of a base station, may cause the one or more processors to receive a compressed precoding matrix indicator from a user equipment. The one or more instructions, when executed by the one or more processors of the base station, may cause the one or more processors to decompress the compressed precoding matrix indicator to recover a precoding matrix indicator, wherein the compressed precoding matrix indicator is decompressed based at least in part on a quantization dependency between transmission layers or an orthogonality relationship between the transmission layers. The one or more instructions, when executed by the one or more processors of the base station, may cause the one or more processors to communicate with the user equipment based at least in part on the precoding matrix indicator.

In some aspects, an apparatus for wireless communication may include means for receiving a compressed precoding matrix indicator from a user equipment. The apparatus may include means for decompressing the compressed precoding matrix indicator to recover a precoding matrix indicator, wherein the compressed precoding matrix indicator is decompressed based at least in part on a quantization dependency between transmission layers or an orthogonality relationship between the transmission layers. The apparatus may include means for communicating with the user equipment based at least in part on the precoding matrix indicator.

In some aspects, a method of wireless communication may include receiving configuration information indicating that the user equipment is to compress a precoding matrix indicator in connection with channel state information reporting, wherein the precoding matrix indicator is to be compressed based at least in part on a quantization dependency between transmission layers or an orthogonality relationship between the transmission layers, wherein the configuration information is associated with a type II, rank 3 or higher codebook for multiple input multiple output (MIMO) configuration. The method may include transmitting, to a base station, the compressed precoding matrix indicator to the base station based at least in part on receiving the configuration information.

In some aspects, a user equipment for wireless communication may include memory and one or more processors coupled to the memory. The memory and the one or more processors may be configured to receive configuration information indicating that the user equipment is to compress a precoding matrix indicator in connection with channel state information reporting, wherein the precoding matrix indicator is to be compressed based at least in part on a quantization dependency between transmission layers or an orthogonality relationship between the transmission layers, wherein the configuration information is associated with a type II, rank 3 or higher codebook for multiple input multiple output (MIMO) configuration. The memory and the one or more processors may be configured to transmit, to a base station, the compressed precoding matrix indicator to the base station based at least in part on receiving the configuration information.

In some aspects, a non-transitory computer-readable medium may store one or more instructions for wireless communication. The one or more instructions, when executed by one or more processors of a user equipment, may cause the one or more processors to receive configuration information indicating that the user equipment is to compress a precoding matrix indicator in connection with channel state information reporting, wherein the precoding matrix indicator is to be compressed based at least in part on a quantization dependency between transmission layers or an orthogonality relationship between the transmission layers, wherein the configuration information is associated with a type II, rank 3 or higher codebook for multiple input multiple output (MIMO) configuration. The one or more instructions, when executed by the one or more processors of the user equipment, may cause the one or more processors to transmit, to a base station, the compressed precoding matrix indicator to the base station based at least in part on receiving the configuration information.

In some aspects, an apparatus for wireless communication may include means for receiving configuration information indicating that the user equipment is to compress a precoding matrix indicator in connection with channel state information reporting, wherein the precoding matrix indicator is to be compressed based at least in part on a quantization dependency between transmission layers or an orthogonality relationship between the transmission layers, wherein the configuration information is associated with a type II, rank 3 or higher codebook for multiple input multiple output (MIMO) configuration. The apparatus may include means for transmitting, to a base station, the compressed precoding matrix indicator to the base station based at least in part on receiving the configuration information.

Aspects generally include a method, apparatus, system, computer program product, non-transitory computer-readable medium, user equipment, wireless communication device, base station, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
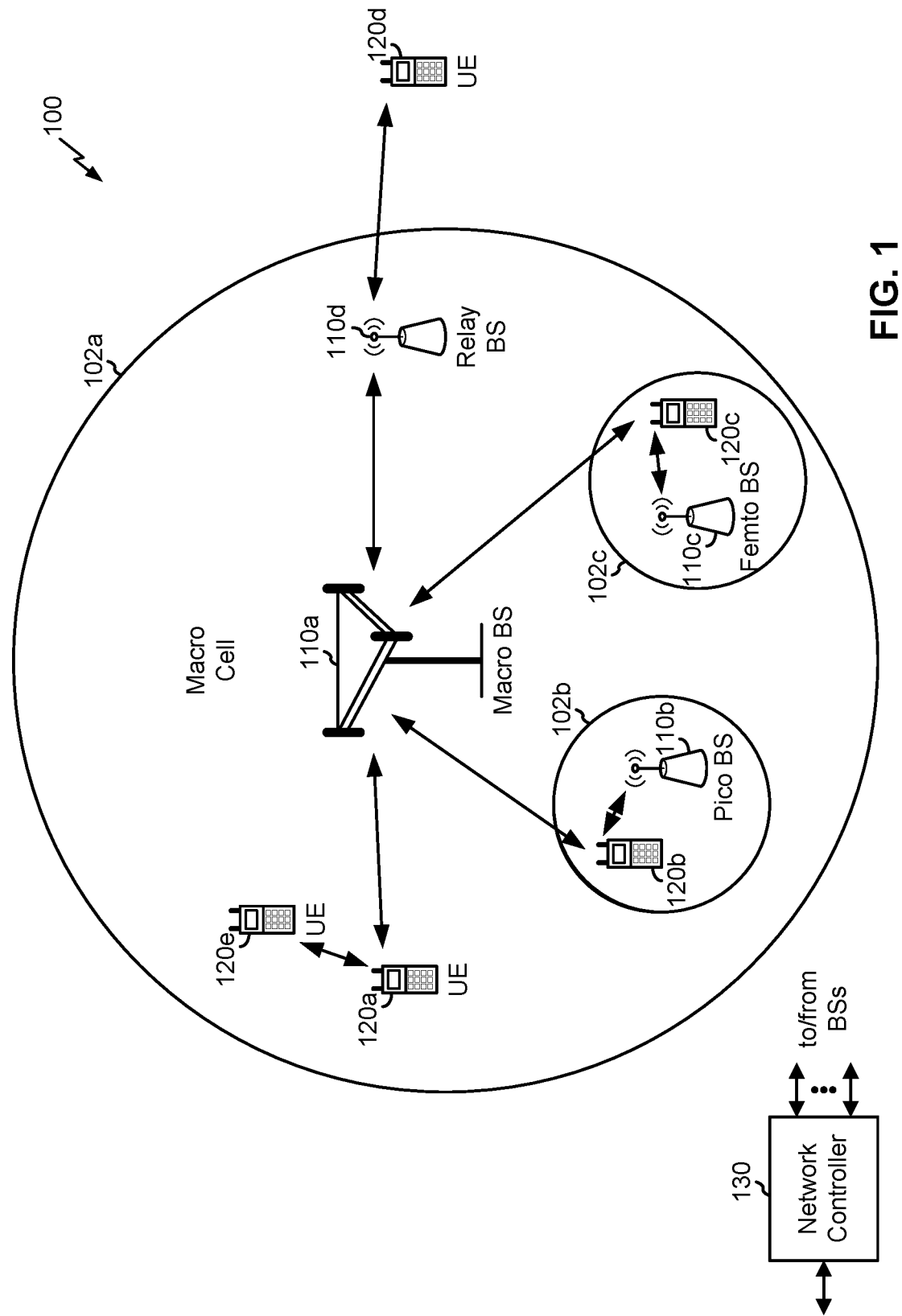
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
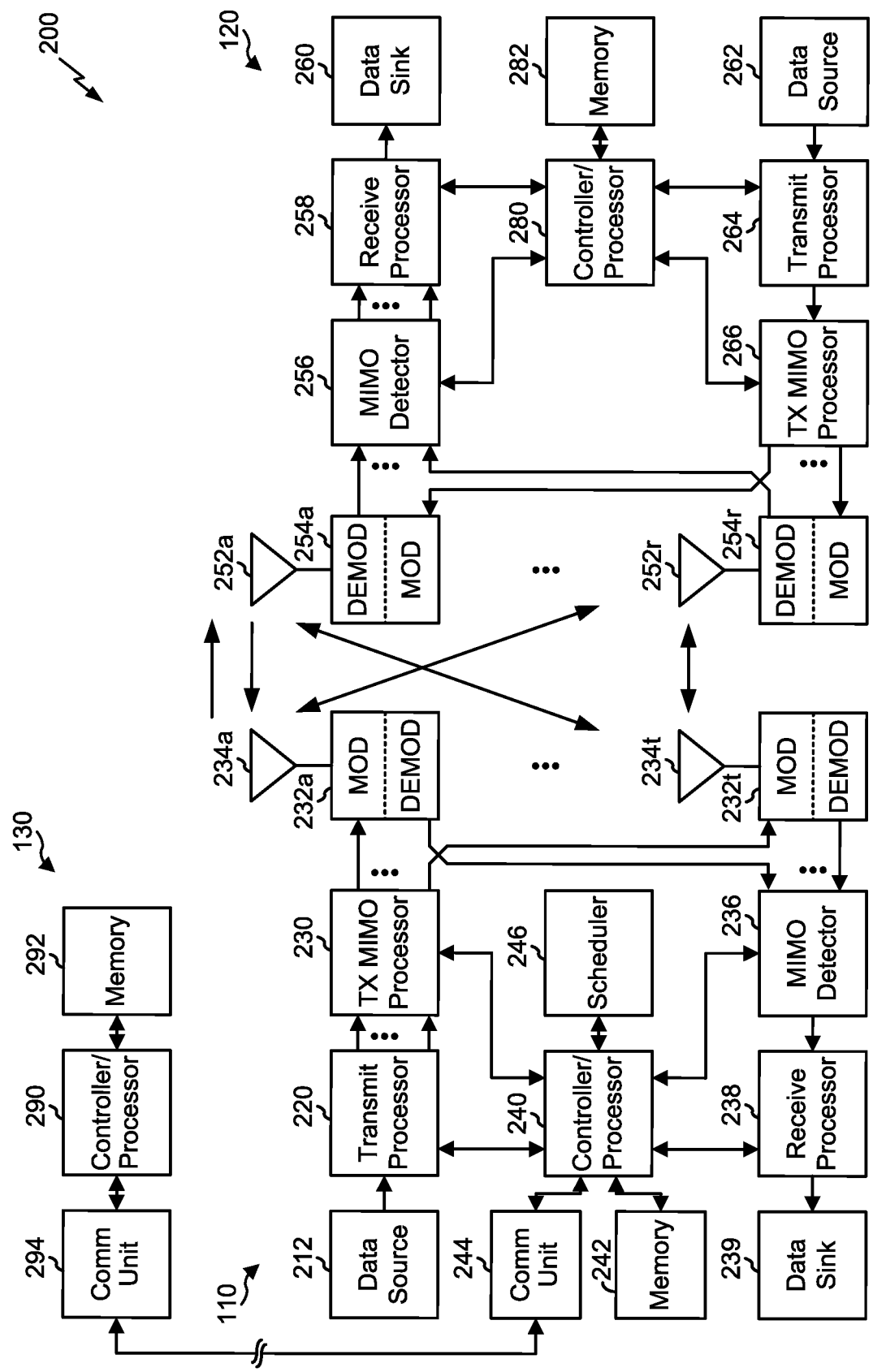
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with precoding configuration, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving configuration information indicating that the user equipment is to compress a precoding matrix indicator in connection with channel state information reporting, wherein the precoding matrix indicator is to be compressed based at least in part on a quantization dependency between transmission layers or an orthogonality relationship between the transmission layers, wherein the configuration information is associated with a type II, rank 3 or higher codebook for multiple input multiple output (MIMO) configuration; means for transmitting, to a base station, the compressed precoding matrix indicator to the base station based at least in part on receiving the configuration information; and/or the like. In some aspects, such means may include one or more components of UE 120 described in connection with FIG. 2.

In some aspects, base station 110 may include means for receiving a compressed precoding matrix indicator from a user equipment; means for decompressing the compressed precoding matrix indicator to recover a precoding matrix indicator, wherein the compressed precoding matrix indicator is decompressed based at least in part on a quantization dependency between transmission layers or an orthogonality relationship between the transmission layers; means for communicating with the user equipment based at least in part on the precoding matrix indicator; and/or the like. In some aspects, such means may include one or more components of base station 110 described in connection with FIG. 2.

As indicated above, FIG. 2 is provided merely as an example. Other examples may differ from what is described with regard to FIG. 2.

Figure 3A:
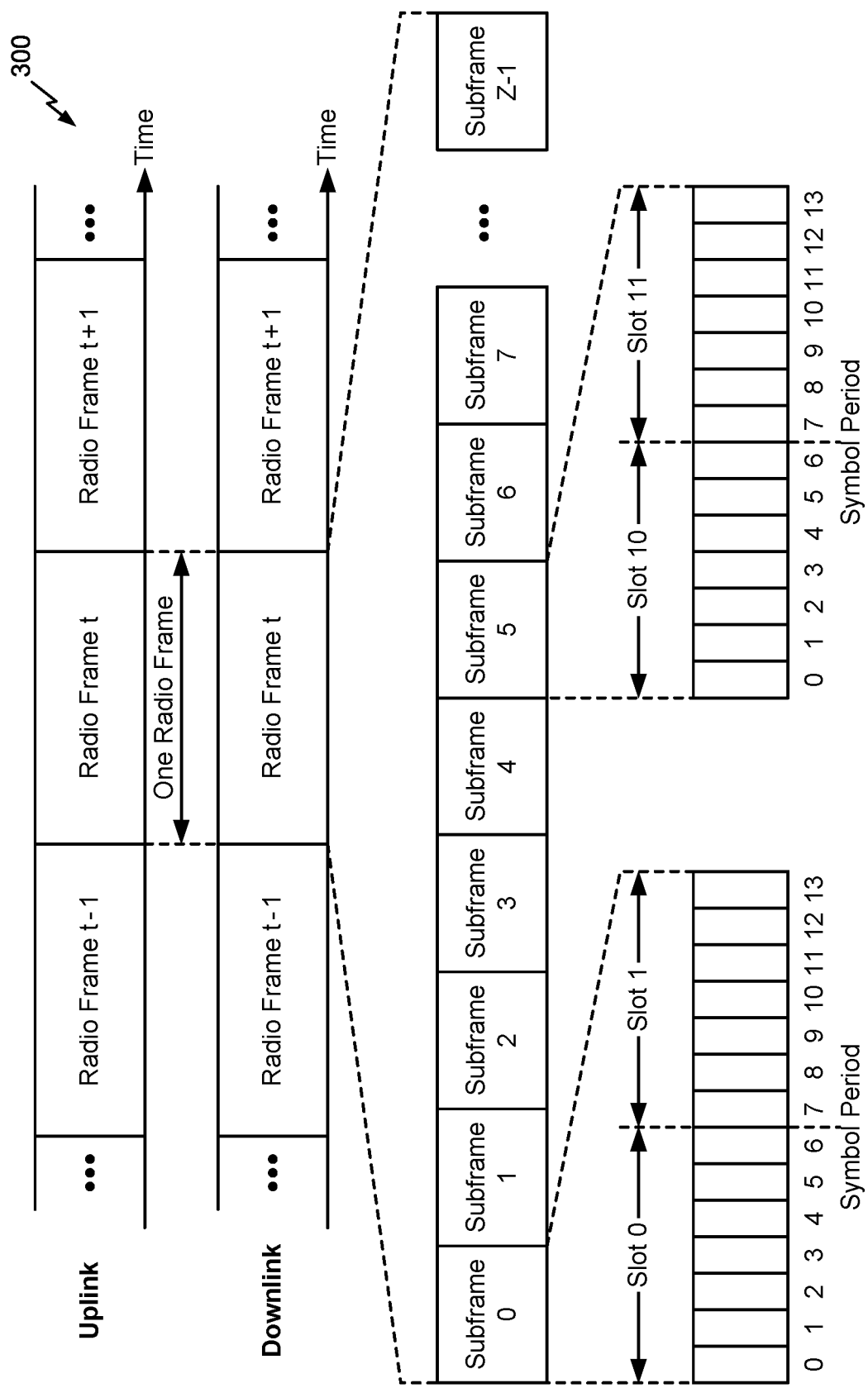
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z-1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L-1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
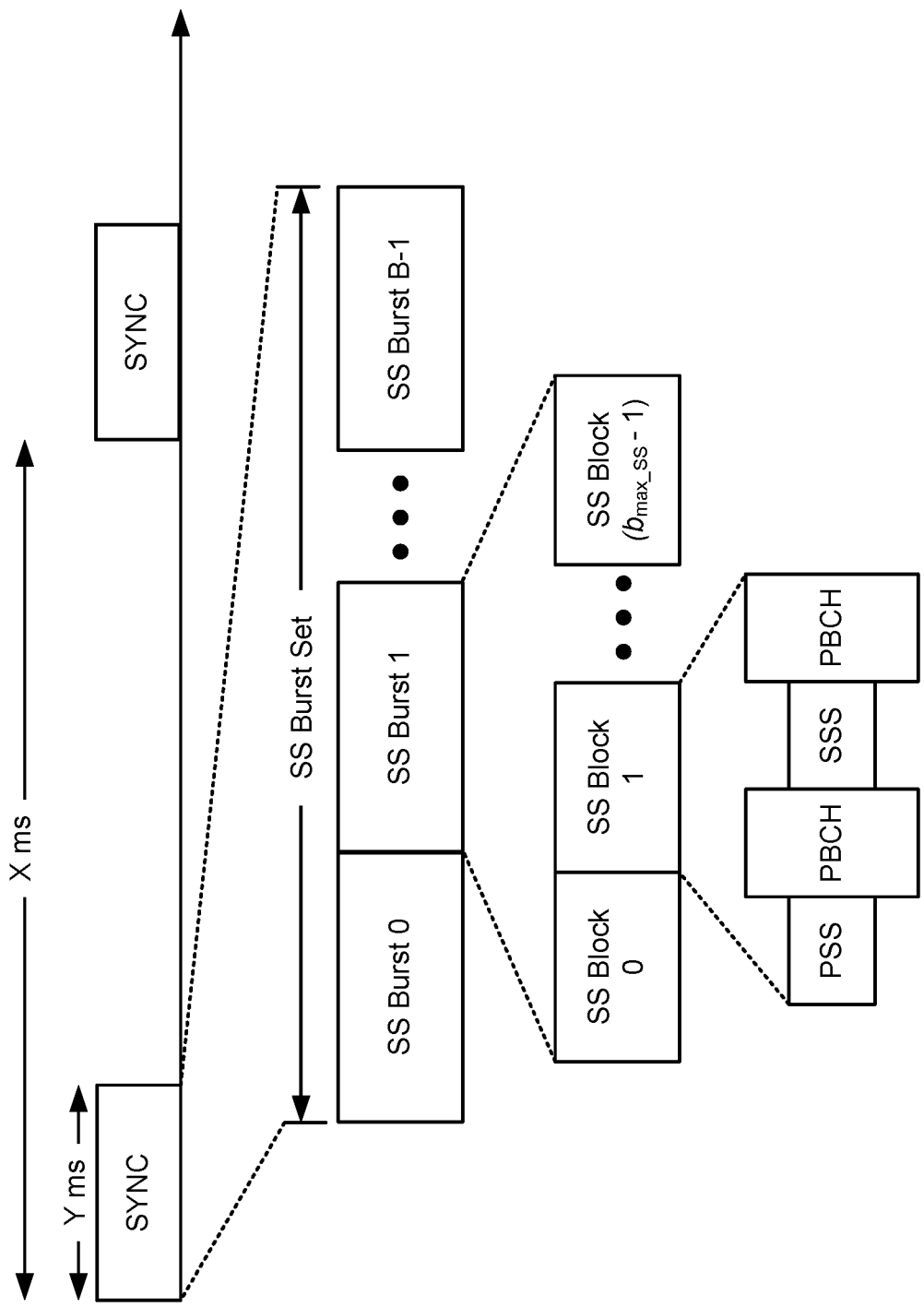
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples may differ from what is described with regard to FIGS. 3A and 3B.

Figure 4:
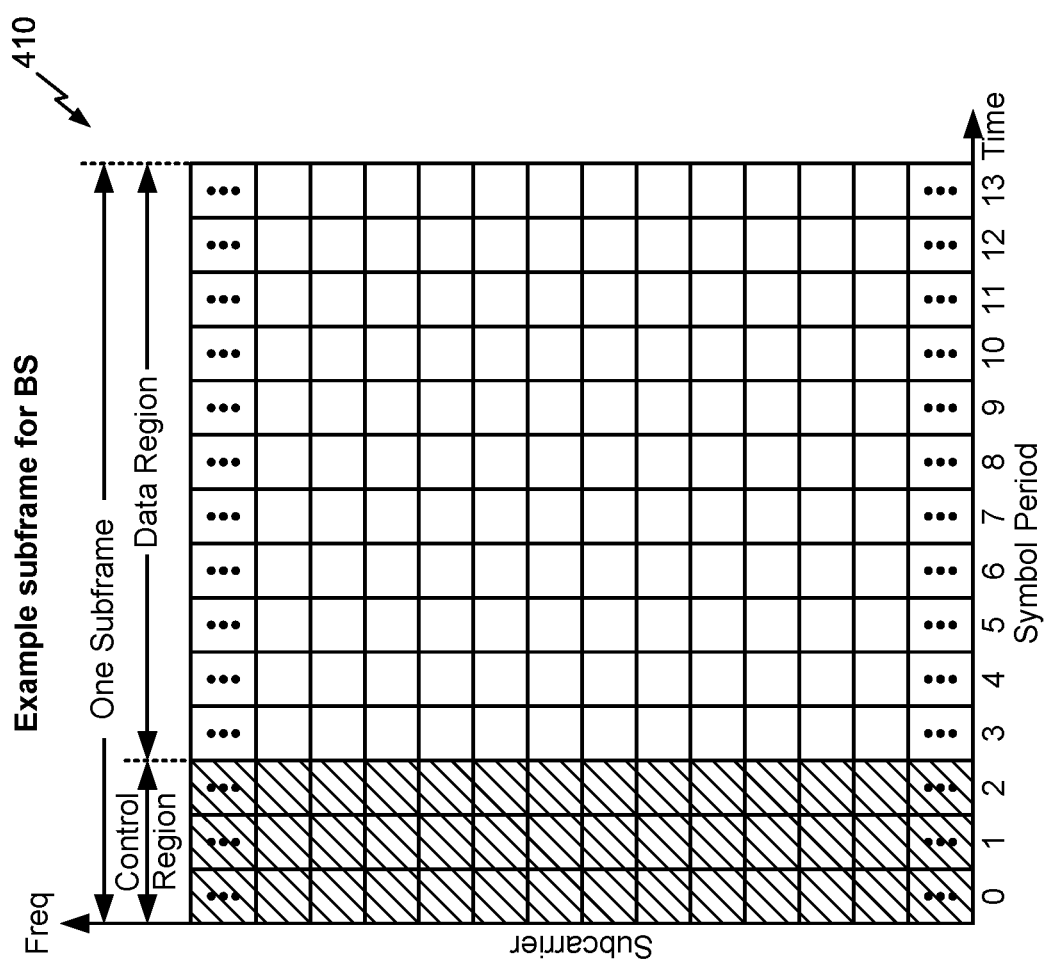
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q-1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

Figure 5:
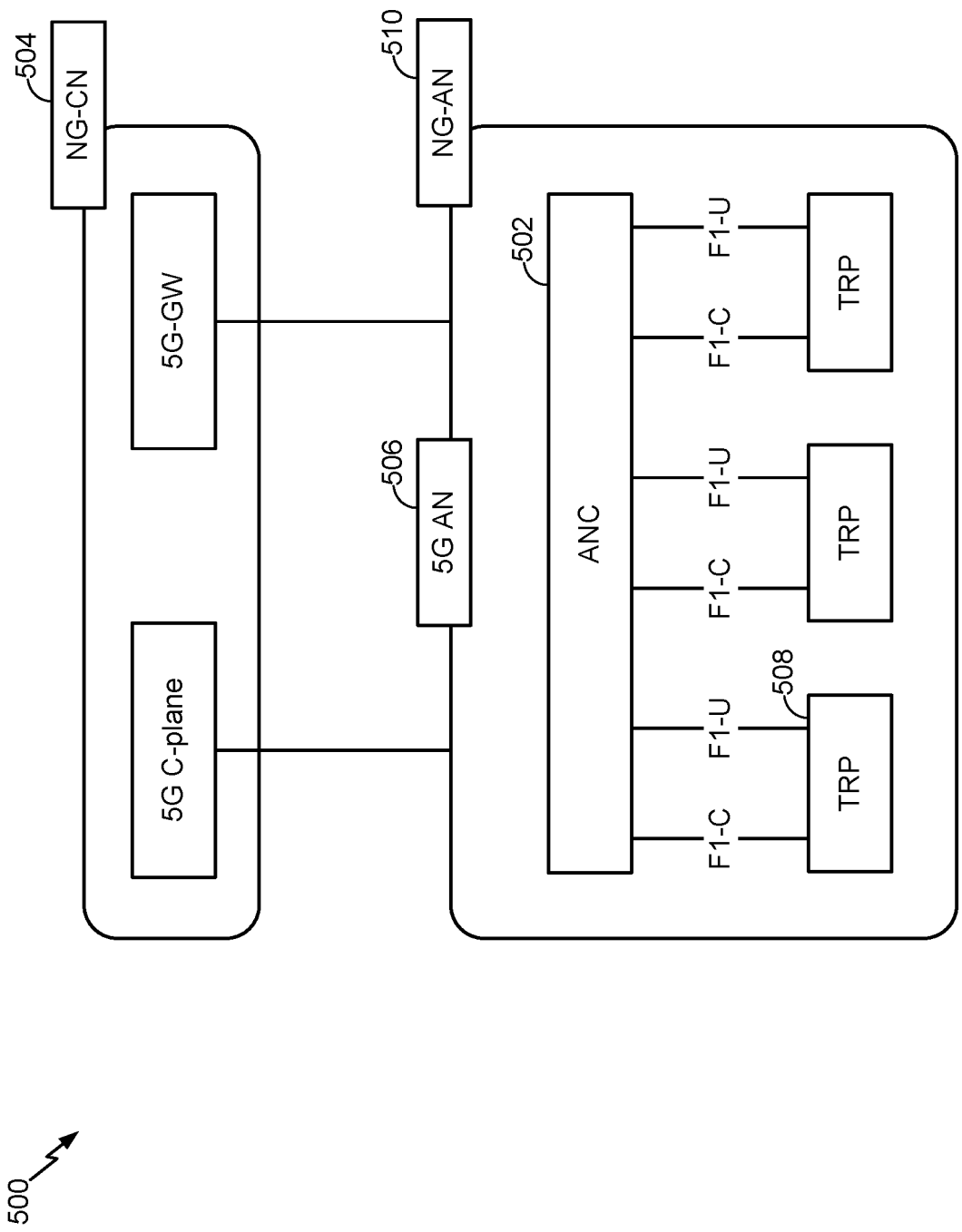
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined to support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
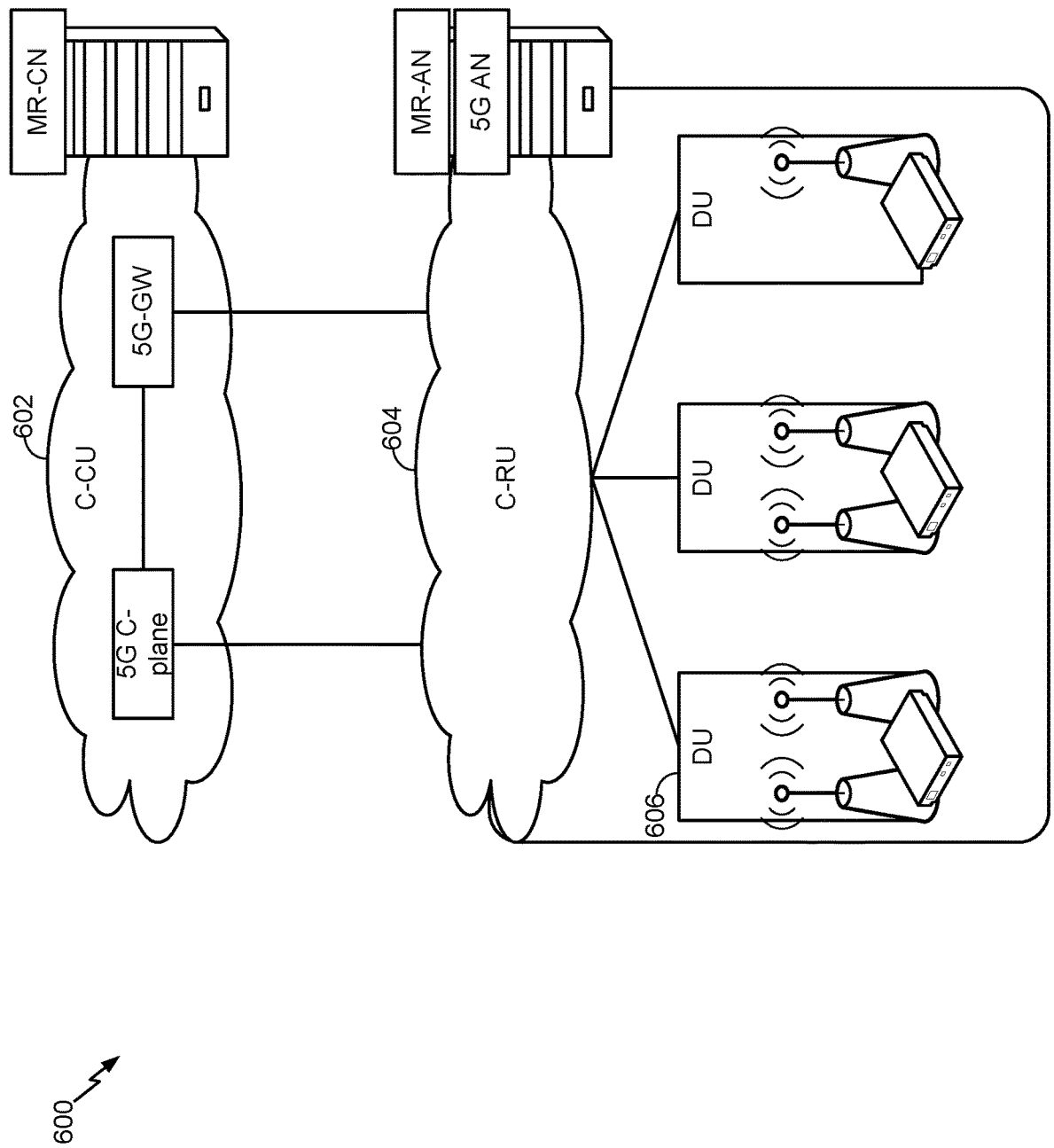
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what is described with regard to FIG. 6.

Precoding may be used, in some communications systems, to enable multi-stream transmission in multi-antenna communications with reduced utilization of computing and/or memory resources to decode a transmission by a UE. A UE may provide a precoding matrix indicator (PMI) to provide spatial channel information feedback. The precoding matrix indicator may be associated with a precoding matrix for a particular rank. For example, a type II rank 1 precoding matrix may take the form:

$$W = \begin{bmatrix} \tilde{w}_{0,0} \\ \tilde{w}_{1,0} \end{bmatrix} = W_1 W_2 \quad (1)$$

where W is normalized to 1, and represents weights that a BS is to apply to each antenna for communication. Similarly, a type II rank 2 precoding matrix may take the form:

$$W = \begin{bmatrix} \tilde{w}_{0,0} & \tilde{w}_{0,1} \\ \tilde{w}_{1,0} & \tilde{w}_{1,1} \end{bmatrix} = W_1 W_2 \quad (2)$$

where columns of W are normalized to $1/\sqrt{2}$. In this case, a BS may determine a weighted combination of L beams as:

$$\tilde{w}_{r,l} = \sum_{i=0}^{L-1} b_{k_1^{(i)}, k_2^{(i)}} \cdot p_{r,l,i}^{(WB)} \cdot p_{r,l,i}^{(SB)} \cdot c_{r,l,i} \quad (3)$$

where L is a quantity of beams and may be a configured value (e.g., $L \in \{2,3,4\}$), $b_{k_1,k_2}$ represents an oversampled two-dimensional discrete Fourier transform (2D-DFT) beam, $p_{r,l,i}^{(WB)}$ represents a wideband beam amplitude scaling factor for a beam i using a polarization r and using a layer l, $p_{r,l,i}^{(SB)}$ represents a sub-band beam amplitude scaling factor, and $c_{r,l,i}$ represents a beam combining coefficient relating to a phase of a beam. In this case, polarization values for r may be limited to 0 and 1, and layer values for l may be limited to 0 and 1. However, for higher rank codebooks (i.e., rank three or higher codebooks), such as a rank 3 codebook, a rank 4 codebook, and/or the like, a quantity of layers l may increase to, for example, 2, 3, and/or the like.

Increasing a rank of a codebook to a higher rank codebook (e.g., a type II rank 3 codebook, a type II rank 4 codebook, and/or the like) may result in an excessive amount of overhead (e.g., greater than a threshold amount of overhead) for a BS. Moreover, an energy mismatch between layers may be greater than a threshold, which may limit utilization of the higher rank codebook. Some aspects, described herein, may use layer power feedback information when selecting a communication configuration to compensate for a threshold energy mismatch when using a type II higher rank codebook. Moreover, some aspects described herein may select a beam parameter of the communication configuration based at least in part on a quantization dependency between transmission layers or an orthogonality relationship between transmission layers. In this way, an amount of overhead in transmission may be reduced relative to other techniques for implementing a higher rank codebook.

Figure 7:
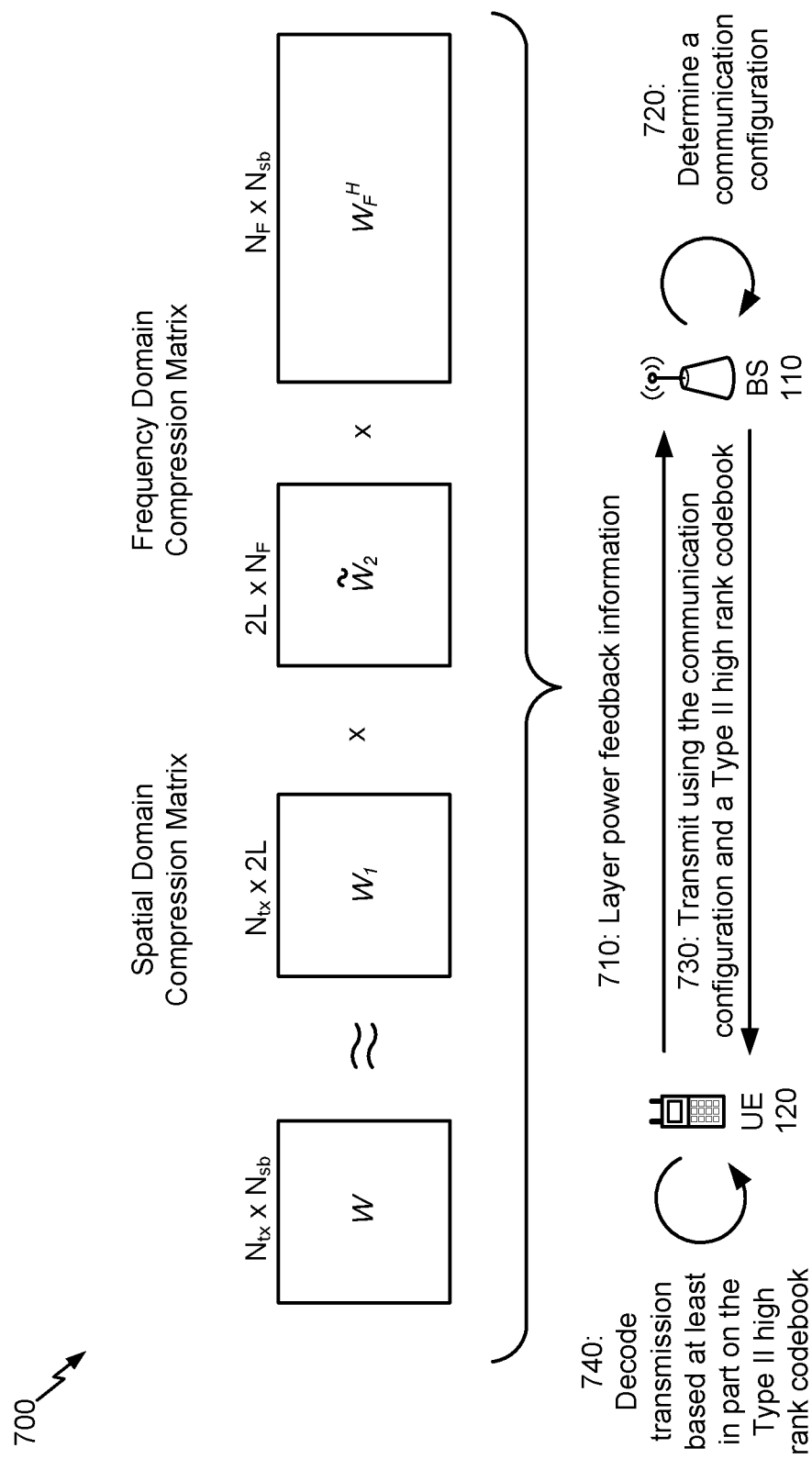
FIG. 7 is a diagram illustrating an example of precoding configuration, in accordance with various aspects of the present disclosure.

FIG. 7 is a diagram illustrating an example 700 of precoding configuration, in accordance with various aspects of the present disclosure. As shown in FIG. 7, example 700 includes a BS 110 and a UE 120.

As further shown in FIG. 7, and by reference number 710, UE 120 may transmit, and BS 110 may receive, layer power feedback information. For example, UE 120 may determine layer power feedback information identifying a relative power of one or more transmission layers, and UE 120 may transmit the layer power feedback information to BS 110. In some aspects, UE 120 may determine the layer power feedback information based at least in part on one or more measurements. For example, UE 120 may perform a measurement of a signal from BS 110 (e.g., a reference signal) and transmitted using a plurality of transmission layers, and may provide information associated with the measurement to BS 110 to enable precoding.

As further shown in FIG. 7, and by reference number 720, BS 110 may determine a communication configuration. For example, BS 110 may select one or more beam parameters for transmission of a communication using a plurality of transmission layers. In some aspects, BS 110 may select a beam parameter for precoding of data of the communication. For example, BS 110 may select a beam parameter relating to an amplitude for a transmission layer used for transmitting the data, a phase for the transmission layer, and/or the like. In some aspects, BS 110 may use a higher rank codebook. For example, BS 110 may use a type II rank three or higher codebook (e.g., a type II rank 3 codebook, a type II rank 4 codebook, and/or the like). In this case, BS 110 may precode the data using the type II rank three or higher codebook and based at least in part on layer power feedback information.

In some aspects, BS 110 may select a beam parameter of the communication configuration based at least in part on a quantization dependency between transmission layers. For example, BS 110 may determine to use wideband amplitude scaling for a third transmission layer, fourth transmission layer, or other higher transmission layer rather than using sub-band amplitude scaling or a combination of sub-band amplitude scaling and wideband amplitude scaling. In this case, BS 110 may select an amplitude parameter based at least in part on wideband amplitude scaling information. In this way, BS 110 may reduce an amount of overhead (e.g., precoding overhead) associated with transmission of the communication. In some aspects, BS 110 may determine to use sub-band amplitude scaling or a combination of wideband and sub-band amplitude scaling for a lower transmission layer (e.g., a first transmission layer or a second transmission layer). For example, BS 110 may use wideband-only amplitude scaling for higher transmission layers and both wideband amplitude scaling and sub-band amplitude scaling for lower transmission layers.

Additionally, or alternatively, BS 110 may determine to use a reduced quantization of bits for sub-band amplitude scaling or sub-band phase configuration. For example, BS 110 may determine to use sub-band amplitude scaling for higher transmission layers (e.g., the third transmission layer, the fourth transmission layer, and/or the like), but may determine to use a two-bit quantization rather than a threebit quantization, thereby reducing overhead associated with transmission of the communication. Additionally, or alternatively, UE 120 and/or BS 110 may determine to omit one or more amplitude scaling parameters from a report identifying a set of amplitude scaling parameters. For example, UE 120 may omit one or more lowest wideband amplitude scaling parameters corresponding to one or more sub-band amplitude scaling parameters, and BS 110 may determine precoding based at least in part on one or more other sub-band amplitude scaling parameters that are provided.

In some aspects, BS 110 may select a beam parameter of the communication configuration based at least in part on a layer dependent linear combination of beams. For example, for a higher transmission layer (e.g., the third transmission layer, the fourth transmission layer, and/or the like), BS 110 may select a quantity of M beams for linear combination. In this case, the quantity of beams selected for the higher transmission layer may be less than a quantity of beams L configured for a lower transmission layer (e.g., M<L).

In some aspects, the group of M beams selected for the higher transmission layer may be selected based at least in part on an orthogonality relationship. For example, the group of M beams may be selected from a group of $N_1*N_2$ orthogonal beams available for selection. In this case, an overhead associated with transmission of a communication using the group of M beams may be determined as $\log_2 C_{N1N2}{}^M$ where C represents a quantity of bits. Additionally, or alternatively, the group of M beams may be selected from the group of L beams configured for the lower transmission layer. In this case, an overhead associated with transmission of a communication using the group of M beams may be determined as $\log_2 C_L{}^M$.

In some aspects, BS 110 may compress one or more components associated with a higher transmission layer (e.g., the third transmission layer, the fourth transmission layer, and/or the like) based at least in part on an orthogonality relationship with one or more corresponding components associated with a lower transmission layer. For example, one or more components may be compressed using wideband amplitude feedback for the higher transmission layer, thereby reducing a quantity of bits of overhead. In some aspects, a phase parameter may be compressed. For example, BS 110 may use a cost function to compress a phase parameter to minimize a Euclidian distance for the phase parameter with a corresponding parameter value for a lower transmission layer. In this case, a weighted combination of beams may be determined as:

$$\min_{c_{i,j} \in \psi} \text{abs}\left(\sum_{j \in \psi} p_{0,j} c_{0,j} * p_{i,j} c_{i,j} + \sum_{j \notin \psi} p_{0,j} c_{0,j} * p_{i,j} c_{i,j}\right) + \text{abs}\left(\sum_{j \in \psi} p_{1,j} c_{1,j} * p_{i,j} c_{i,j} + \sum_{j \notin \psi} p_{1,j} c_{1,j} * p_{i,j} c_{i,j}\right) \quad (4)$$

where $c_{i,j}$ is selected based at least in part on a phase quantization level associated with a modulation phase (e.g., a QPSK modulation phase, an 8PSK modulation phase, and/or the like). In some aspects, BS 110 may resolve between multiple candidate values for $c_{i,j}$. For example, BS 110 may select a parameter based at least at least in part on a prioritization rule, such as a stored or preconfigured prioritization rule.

In some aspects, BS 110 may determine a power adjustment for a transmission layer based at least in part on layer power feedback information from UE 120. For example, UE 120 may provide a precoder matrix indicator (PMI) parameter to enable determination of a communication configuration for precoding, and may include the layer power feedback information to identify relative transmission powers of a set of transmission layers. In this case, BS 110 may determine Eigen values for the set of layers, and may allocate transmission power based at least in part on the Eigen values. For example, BS 110 may increase a transmission power allocation to a transmission layer with a relatively large Eigen value, and may reduce a transmission power allocation for a transmission layer with a relatively small Eigen value. In this way, for single user MIMO (SU-MIMO), BS 110 may balance a signal to noise ratio (SNR) for the plurality of transmission layers, thereby enabling use of a single code for higher rank precoding (e.g., rank 3 precoding, rank 4 precoding, and/or the like). Additionally, or alternatively, for multiple user MIMO (MU-MIMO), BS 110 may adjust a transmission layer amplitude on a per transmission layer basis to achieve signal-to-leakage-and-noise ratio (SLNR) precoding for MU-MIMO precoding.

In some aspects, BS 110 may determine a precoding matrix for precoding based at least in part on the layer power feedback information. For example, BS 110 may determine the precoding matrix as:

$$W = [e_0 v_0 e_1 v_1 \ldots e_{L-1} v_{L-1}] \quad (5)$$

where L represents a quantity of transmission layers and a rank of the precoding matrix; $e_j$ represents a relative amplitude of a layer, j; $v_j$ represents a precoder for the layer j as a vector of length, N, the value of N corresponds to a quantity of transmit antennas, and a value for $v_j^H v_j = 1$; and a layer j of W is normalized to a value of $1/\sqrt{\sum_{n=0}^{L-1} e_n^2}$. Moreover, in this case, a value for $e_0$ may be a fixed value (e.g., 1, representing a reference value), and other values for e (e.g., $e_1, \ldots, e_{L-1}$) are selected from a set of stored values or preconfigured values (e.g., $\sqrt{4}, \sqrt{2}, 1, \sqrt{0.5}, \sqrt{0.25}$, a subset thereof, and/or the like).

In some aspects, a plurality of transmission layers may be associated with a common amplitude (e.g., $e_0 = e_1$, $e_2 = e_3$, and/or the like). In some aspects, feedback information for the transmission layer amplitudes may be wideband feedback information, sub-band feedback information, and/or the like. Additionally, or alternatively, feedback information for the transmission layer amplitudes may be differential feedback information. For example, feedback information for a transmission layer j may be determined as:

$$e_j - e_{j,wb} * e_{j,sb} \quad (6)$$

where $e_{j,wb}$ represents wideband feedback information and $e_{j,sb}$ represents sub-band feedback information.

In some aspects, BS 110 may recover a precoder matrix indicator (PMI) based at least in part on coefficient reporting being excluded for a second layer or higher layer (e.g., a third layer, a fourth later, and/or the like). For example, and as shown in FIG. 7, a first layer PMI may be reported and reconstructed as:

$$W = W_s \tilde{W}_{2,1} W_F^H; \tilde{W}_{2,1} \quad (7)$$

where W represents a coefficient for the first layer coefficient matrix, and where an ith column (e.g., representing a sub-band) of W takes the form $w_1(i)$. In this case, a second layer PMI may be reported as:

$$W = W_s \tilde{W}_{2,2} W_F^H; \tilde{W}_{2,2} \quad (8)$$

where W represents a coefficient for the second layer coefficient matrix, and where the ith column of W takes the form $w_2(i)$. In this case, in $\tilde{W}^{2,2}$ one or more coefficients of a corresponding row (e.g., representing a beam) are not reported, such that:

$$w_1(i)^H w_2(i)=0 \qquad (9)$$

In some aspects, the non-reported row may be associated with a per-beam wideband amplitude, and may be defined based at least in part on a pre-defined rule. For example, the non-reported row may be defined based at least in part on a last beam index before the non-reported row. Similarly, for other layers, such as a 3rd layer or a 4th layer, a non-reported coefficient may, respectively, take the form:

$$w_1(i)^H w_3(i)=0 \qquad (10)$$

$$w_2(i)^H w_3(i)=0 \qquad (11)$$

In some aspects, two rows of $\tilde{W}_{2,1}$ may be unreported. For example, the unreported rows may be appended at an end of a PMI, and may be dropped based at least in part on a CSI reporting resource size being too small to include the unreported rows. In some aspects, BS 110 may recover the unreported rows. For example, BS 110 may use an orthogonality relationship of, for example, the second layer to the first layer to recover unreported coefficients relating to the second layer.

As further shown in FIG. 7, and by reference number 730, BS 110 may transmit, and UE 120 may receive, a communication using the communication configuration and a type II high rank codebook. For example, using the type II high rank codebook to perform precoding based at least in part on the communication configuration, BS 110 may transmit precoded data to UE 120 to enable UE 120 to receive and decode the precoded data to determine the communication with reduced processing and/or memory utilization relative to non-precoded data.

As further shown in FIG. 7, and by reference number 740, UE 120 may decode the communication transmitted by BS 110 based at least in part on the type II high rank codebook. For example, UE 120 may decode the precoded data of the communication to receive the communication. In some aspects, UE 120 may decode the communication based at least in part on information associated with the type II high rank codebook. For example, based at least in part on stored information and/or information provided by BS 110 associated with decoding the precoded data of the communication, UE 120 may decode the precoded data of the communication to receive the communication.

As indicated above, FIG. 7 is provided as an example. Other examples are possible and may differ from what was described with respect to FIG. 7.

Figure 8:
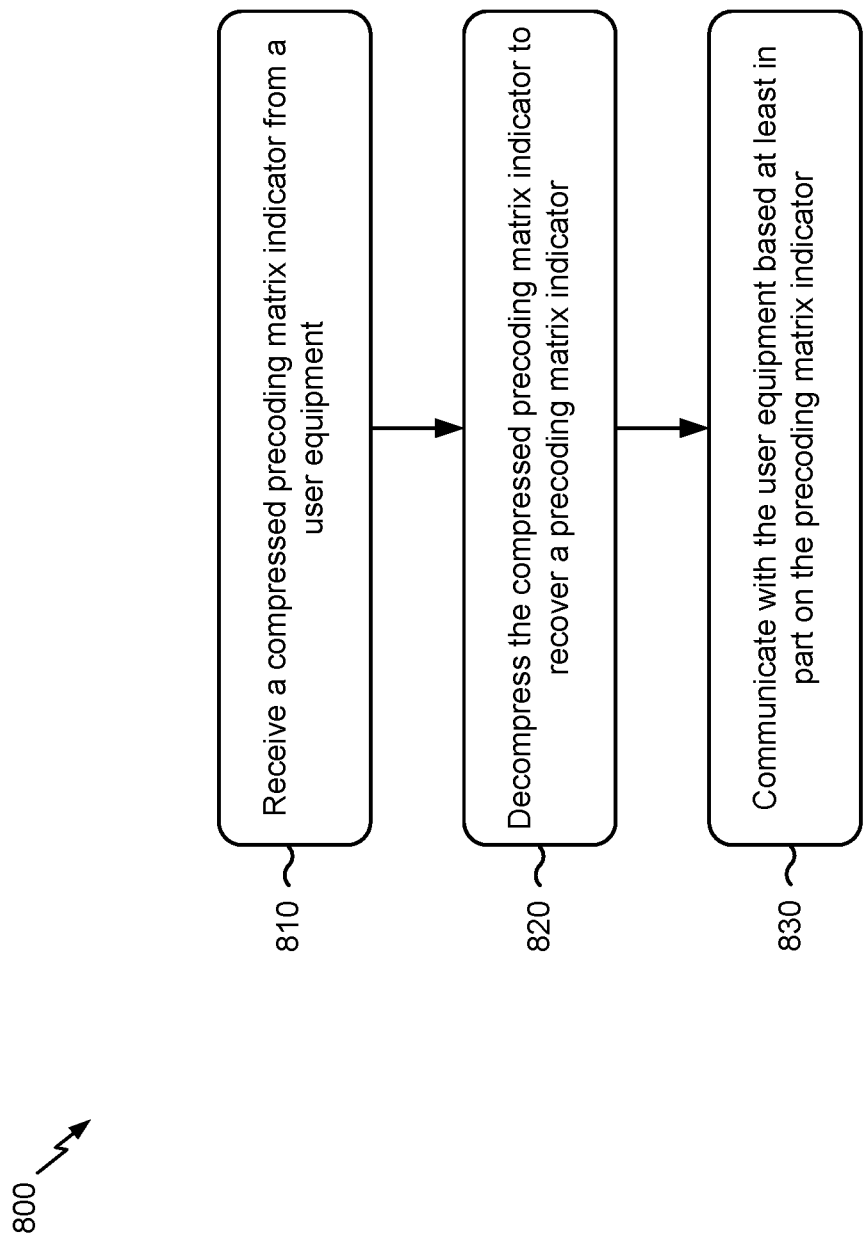
FIG. 8 is a diagram illustrating an example process performed, for example, by a base station, in accordance with various aspects of the present disclosure.

FIG. 8 is a diagram illustrating an example process 800 performed, for example, by a BS, in accordance with various aspects of the present disclosure. Example process 800 is an example where a BS (e.g., BS 110) performs precoding configuration.

As shown in FIG. 8, in some aspects, process 800 may include receiving a compressed precoding matrix indicator from a user equipment (block 810). For example, in some aspects, the BS (e.g., using antenna 234, demodulator 232, MIMO detector 236, receive processor 238, and/or the like) may receive a compressed precoding matrix indicator from a user equipment.

As shown in FIG. 8, in some aspects, process 800 may include decompressing the compressed precoding matrix indicator to recover a precoding matrix indicator (block 820). For example, the BS (e.g., using transmit processor 220, TX MIMO processor 230, controller/processor 240, receive processor 238, MIMO detector 236, and/or the like), may decompress the compressed precoding matrix indicator to recover a precoding matrix indicator, wherein the compressed precoding matrix indicator is decompressed based at least in part on a quantization dependency between transmission layers or an orthogonality relationship between the transmission layers.

As shown in FIG. 8, in some aspects, process 800 may include communicating with the user equipment based at least in part on the precoding matrix indicator (block 830). For example, the BS (e.g., using transmit processor 220, TX MIMO processor 230, modulator 232, antenna 234, and/or the like) may communicate with the user equipment based at least in part on the precoding matrix indicator.

Process 800 may include additional aspects, such as any single aspect and/or any combination of aspects described below and/or in connection with one or more other processes described elsewhere herein.

In some aspects, the process 800 may include determining, based at least in part on the precoding matrix indicator, a communication configuration for a communication from the BS to a user equipment comprising a plurality of transmission layers, wherein the communication configuration includes a beam parameter selected based at least in part on a quantization dependency between the transmission layers or an orthogonality relationship between the transmission layers, wherein the communication configuration is determined based at least in part on a type II, rank 3 or higher codebook for multiple input multiple output (MIMO) configuration; and transmitting, to the user equipment, a the communication using the communication configuration determined based at least in part on the precoding matrix indicator. In some aspects, process 800 may include receiving, from the user equipment, layer power feedback information as a part of the precoding matrix indicator. In some aspects, process 800 may include configuring the user equipment to provide the compressed precoding matrix indicator.

In some aspects, the beam parameter is selected based at least in part on the quantization dependency between the transmission layers. In some aspects, the beam parameter is at least one of an amplitude parameter, a phase parameter, or a frequency parameter. In some aspects, the communication configuration includes a wideband amplitude configuration for a third layer or a fourth layer of the transmission layers and a sub-band amplitude configuration for at least one other layer of the transmission layers. In some aspects, the communication configuration is determined based at least in part on a reduced bit quantization relative to a configured quantization for a phase or an amplitude.

In some aspects, information relating to a lowest wideband amplitude parameter, of a plurality of amplitude parameters, is not reported in connection with the communication configuration. In some aspects, the communication configuration is determined based at least in part on a layer dependent linear combination of beams. In some aspects, a subset of the layer dependent linear combination of beams is selected. In some aspects, one or more orthogonal beams is selected from the layer dependent linear combination of beams. In some aspects, the beam parameter is selected based at least in part on the orthogonality relationship between the transmission layers.

In some aspects, the communication configuration includes at least one component relating to a third layer or a fourth layer, of the transmission layers, determined based at least in part on the orthogonality relationship to a first layer or a second layer of the transmission layers. In some aspects, the communication configuration includes a plurality of components compressed based at least in part on wideband amplitude feedback relating to a third layer or a fourth layer of the transmission layers. In some aspects, the communication configuration includes the communication configuration includes a plurality of components determined based at least in part on a smallest wideband amplitude. In some aspects, the communication configuration includes a phase compression of a layer, of the transmission layers, selected based at least in part on a Euclidian distance determination.

In some aspects, the communication configuration includes a plurality of components determined based at least in part on a stored priority rule. In some aspects, the layer power feedback information identifies relative powers of two or more layers of the transmission layers. In some aspects, the communication configuration includes a layer power adjustment determined based at least in part on an Eigen value for a layer of the transmission layers.

In some aspects, the communication configuration is determined based at least in part on a layer amplitude for a layer of the transmission layers. In some aspects, a precoding matrix is determined based at least in part on a per layer relative power determined based at least in part on the layer power feedback information. In some aspects, a plurality of layers share a common relative power. In some aspects, the layer power feedback information is associated with at least one of a wideband or a sub-band.

In some aspects, a frequency coefficient is excluded from reporting for a second or higher layer of the transmission layers. In some aspects, the BS is configured to recover a pre-coding matrix indicator for the second or higher layer based at least in part on the orthogonality relationship with a first layer of the transmission layers and a pre-coding matrix indicator for the first layer. In some aspects, the frequency coefficient is associated with a wideband amplitude and defined by a pre-defined rule. In some aspects, the frequency coefficient is associated with a low-priority portion of the reporting and dropped based at least in part on a size of a channel state information reporting resource.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
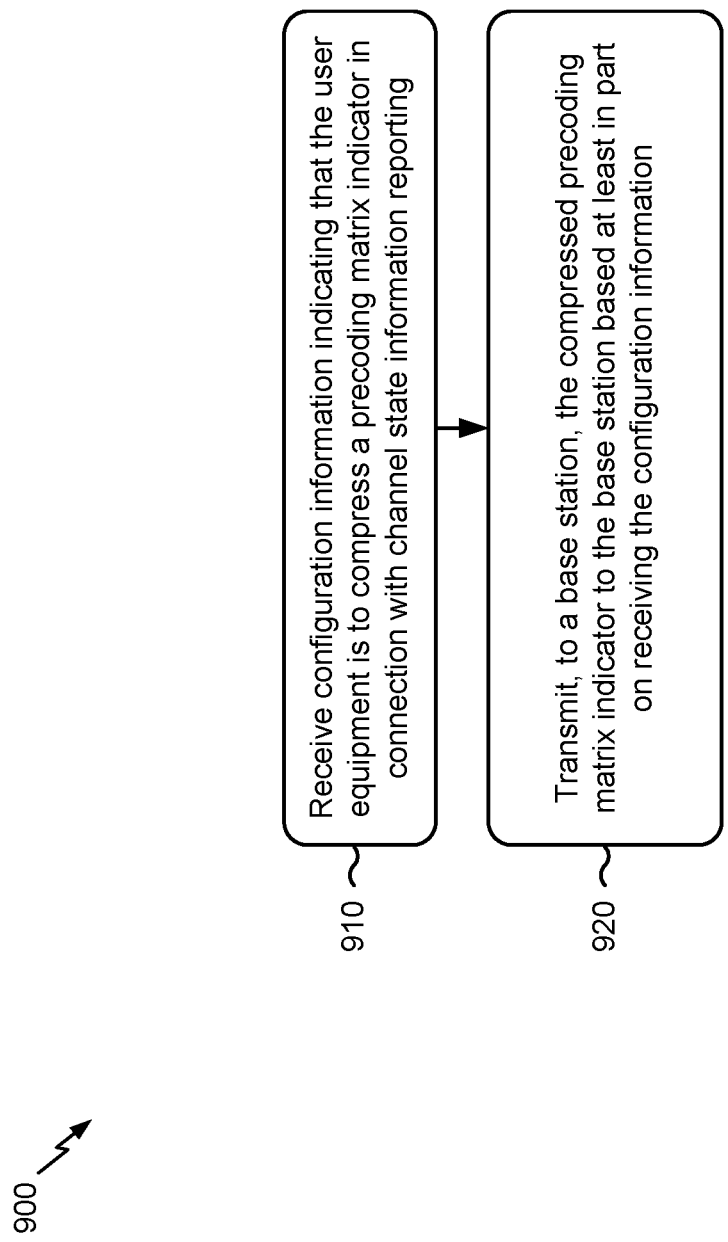
FIG. 9 is a diagram illustrating an example process performed, for example, by a user equipment, in accordance with various aspects of the present disclosure.

FIG. 9 is a diagram illustrating an example process 900 performed, for example, by a UE, in accordance with various aspects of the present disclosure. Example process 900 is an example where a UE (e.g., UE 120) performs precoding configuration.

As shown in FIG. 9, in some aspects, process 900 may include receiving configuration information indicating that the user equipment is to compress a precoding matrix indicator in connection with channel state information reporting (block 910). For example, in some aspects, the UE (e.g., using antenna 252, demodulator 254, MIMO detector 256, receiver processor 258, and/or the like) may receive configuration information indicating that the user equipment is to compress a precoding matrix indicator in connection with channel state information reporting, wherein the precoding matrix indicator is to be compressed based at least in part on a quantization dependency between transmission layers or an orthogonality relationship between the transmission layers, wherein the configuration information is associated with a type II, rank 3 or higher codebook for multiple input multiple output (MIMO) configuration.

As shown in FIG. 9, in some aspects, process 900 may include transmitting, to a base station, the compressed precoding matrix indicator to the base station based at least in part on receiving the configuration information (block 920). For example, the UE (e.g., using transmit processor 264, TX MIMO processor 266, modulator 254, antenna 252, and/or the like), to the BS (e.g., BS 110) may transmit, to a base station, the compressed precoding matrix indicator to the base station based at least in part on receiving the configuration information.

Process 900 may include additional aspects, such as any single aspect and/or any combination of aspects described below and/or in connection with one or more other processes described elsewhere herein.

In some aspects, process 900 may include receiving a communication transmitted using a communication configuration determined based at least in part on the precoding matrix indicator. In some aspects, process 900 may include transmitting the layer power feedback information.

In some aspects, the beam parameter is selected based at least in part on the quantization dependency between the transmission layers. In some aspects, the beam parameter is at least one of an amplitude parameter, a phase parameter, or a frequency parameter. In some aspects, the communication configuration includes a wideband amplitude configuration for a third layer or a fourth layer of the transmission layers and a sub-band amplitude configuration for at least one other layer of the transmission layers.

In some aspects, the communication configuration is determined based at least in part on a reduced bit quantization relative to a configured quantization for a phase or an amplitude. In some aspects, information relating to a lowest wideband amplitude parameter, of a plurality of amplitude parameters, is not reported in connection with the communication configuration. In some aspects, the communication configuration is determined based at least in part on a layer dependent linear combination of beams.

In some aspects, a subset of the layer dependent linear combination of beams is selected. In some aspects, one or more orthogonal beams is selected from the layer dependent linear combination of beams. In some aspects, the beam parameter is selected based at least in part on the orthogonality relationship between the transmission layers. In some aspects, the communication configuration includes at least one component relating to a third layer or a fourth layer, of the transmission layers, determined based at least in part on the orthogonality relationship to a first layer or a second layer of the transmission layers.

In some aspects, the communication configuration includes a plurality of components compressed based at least in part on wideband amplitude feedback relating to a third layer or a fourth layer of the transmission layers. In some aspects, the communication configuration includes a plurality of components determined based at least in part on a smallest wideband amplitude. In some aspects, the communication configuration includes a phase compression of a layer, of the transmission layers, selected based at least in part on a Euclidian distance determination.

In some aspects, the communication configuration includes a plurality of components determined based at least in part on a stored priority rule. In some aspects, the layer power feedback information identifies relative powers of two or more layers of the transmission layers. In some aspects, the communication configuration includes a layer power adjustment determined based at least in part on an Eigen value for a layer of the transmission layers. In some aspects, the communication configuration is determined based at least in part on a layer amplitude for a layer of the transmission layers.

In some aspects, a precoding matrix is determined based at least in part on a per layer relative power determined based at least in part on the layer power feedback information. In some aspects, a plurality of layers share a common relative power. In some aspects, the layer power feedback information is associated with at least one of a wideband or a sub-band. In some aspects, a frequency coefficient is excluded from reporting for a second or higher layer of the transmission layers. In some aspects, the frequency coefficient is associated with a low-priority portion of the reporting and dropped based at least in part on a size of a channel state information reporting resource.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a base station (BS), comprising:
   receiving a compressed precoding matrix indicator and layer power feedback information from a user equipment;
   decompressing the compressed precoding matrix indicator to recover a precoding matrix indicator,
      wherein the compressed precoding matrix indicator is decompressed based at least in part on a quantization dependency between transmission layers or an orthogonality relationship between the transmission layers; and
   communicating with the user equipment based at least in part on the precoding matrix indicator.

2. The method of claim 1, wherein the communicating comprises:
   determining, based at least in part on the precoding matrix indicator, a communication configuration,
      wherein the communication configuration is determined based at least in part on a type II, rank 3 or higher codebook for multiple input multiple output (MIMO) configuration; and
   transmitting, to the user equipment, a communication using the communication configuration determined based at least in part on the precoding matrix indicator.

3. The method of claim 1, further comprising:
   receiving, from the user equipment, the layer power feedback information with the precoding matrix indicator.

4. The method of claim 1, further comprising:
   configuring the user equipment to report the compressed precoding matrix indicator.

5. The method of claim 1, wherein the BS is configured to determine a communication configuration based at least in part on the layer power feedback information.

6. The method of claim 1, wherein a beam parameter is selected based at least in part on the quantization dependency between the transmission layers.

7. The method of claim 1, wherein a beam parameter is at least one of an amplitude parameter, a phase parameter, or a frequency parameter.

8. The method of claim 1, wherein a communication configuration includes a wideband amplitude configuration for a third layer or a fourth layer of the transmission layers and a sub-band amplitude configuration for at least one other layer of the transmission layers.

9. The method of claim 1, wherein a communication configuration is determined based at least in part on a reduced bit quantization relative to a configured quantization for a phase or an amplitude.

10. The method of claim 1, wherein information relating to a lowest wideband amplitude parameter, of a plurality of amplitude parameters, is not reported in connection with a communication configuration.

11. The method of claim 1, wherein a communication configuration is determined based at least in part on a layer dependent linear combination of beams.

12. The method of claim 11, wherein a subset of the layer dependent linear combination of beams is selected.

13. The method of claim 11, wherein one or more orthogonal beams is selected from the layer dependent linear combination of beams.

14. The method of claim 1, wherein a beam parameter is selected based at least in part on the orthogonality relationship between the transmission layers.

15. The method of claim 14, wherein a communication configuration includes at least one component relating to a third layer or a fourth layer, of the transmission layers, determined based at least in part on the orthogonality relationship to a first layer or a second layer of the transmission layers.

16. The method of claim 1, wherein a communication configuration includes a plurality of components compressed based at least in part on wideband amplitude feedback relating to a third layer or a fourth layer of the transmission layers.

17. The method of claim 1, wherein a communication configuration includes a plurality of components determined based at least in part on a smallest wideband amplitude.

18. The method of claim 1, wherein a communication configuration includes a phase compression of a layer, of the transmission layers, selected based at least in part on a Euclidian distance determination.

19. The method of claim 1, wherein a communication configuration includes a plurality of components determined based at least in part on a stored priority rule.

20. The method of claim 1, wherein the layer power feedback information identifies relative powers of two or more layers of the transmission layers.

21. The method of claim 1, wherein a communication configuration includes a layer power adjustment determined based at least in part on an Eigen value for a layer of the transmission layers.

22. The method of claim 1, wherein a communication configuration is determined based at least in part on a layer amplitude for a layer of the transmission layers.

23. The method of claim 1, wherein a precoding matrix is determined based at least in part on a per layer relative power determined based at least in part on the layer power feedback information.

24. The method of claim 23, wherein a plurality of layers share a common relative power.

25. The method of claim 23, wherein the layer power feedback information is associated with at least one of a wideband or a sub-band.

26. The method of claim 1, wherein a frequency coefficient is excluded from reporting for a second or higher layer of the transmission layers.

27. The method of claim 26, wherein the BS is configured to recover a pre-coding matrix indicator for the second or higher layer based at least in part on the orthogonality relationship with a first layer of the transmission layers and a pre-coding matrix indicator for the first layer.

28. The method of claim 26, wherein the frequency coefficient is associated with a wideband amplitude and defined by a pre-defined rule.

29. The method of claim 26, wherein the frequency coefficient is associated with a low-priority portion of the reporting and dropped based at least in part on a size of a channel state information reporting resource.

30. An apparatus, comprising:

means for receiving a compressed precoding matrix indicator and layer power feedback information from a user equipment;

means for decompressing the compressed precoding matrix indicator to recover a precoding matrix indicator,
wherein the compressed precoding matrix indicator is decompressed based at least in part on a quantization dependency between transmission layers or an orthogonality relationship between the transmission layers; and means for communicating with the user equipment based at least in part on the precoding matrix indicator.

31. A method of wireless communication performed by a user equipment, comprising:
receiving configuration information indicating that the user equipment is to compress a precoding matrix indicator in connection with channel state information reporting,
wherein the precoding matrix indicator is to be compressed based at least in part on a quantization dependency between transmission layers or an orthogonality relationship between the transmission layers,
wherein the configuration information is associated with a type II, rank 3 or higher codebook for multiple input multiple output (MIMO) configuration; and
transmitting, to a base station, the compressed precoding matrix indicator and layer power feedback information based at least in part on receiving the configuration information.

32. The method of claim 31, further comprising:
receiving a communication transmitted using a communication configuration determined based at least in part on the precoding matrix indicator.

33. The method of claim 31, further comprising:
determining the layer power feedback information in connection with the precoding matrix indicator.

34. The method of claim 31, wherein a beam parameter is selected based at least in part on the quantization dependency between the transmission layers.

35. The method of claim 31, wherein a beam parameter is at least one of an amplitude parameter, a phase parameter, or a frequency parameter.

36. The method of claim 31, wherein the compressed precoding matrix indicator includes a wideband amplitude configuration for a third layer or a fourth layer of the transmission layers and a sub-band amplitude configuration for at least one other layer of the transmission layers.

37. The method of claim 31, wherein the compressed precoding matrix indicator is determined based at least in part on a reduced bit quantization relative to a configured quantization for a phase or an amplitude.

38. The method of claim 31, wherein information relating to a lowest wideband amplitude parameter, of a plurality of amplitude parameters, is not reported in connection with a communication configuration.

39. The method of claim 31, wherein a communication configuration is determined based at least in part on a layer dependent linear combination of beams.

40. The method of claim 39, wherein a subset of the layer dependent linear combination of beams is selected.

41. The method of claim 39, wherein one or more orthogonal beams is selected from the layer dependent linear combination of beams.

42. The method of claim 31, wherein a beam parameter is selected based at least in part on the orthogonality relationship between the transmission layers.

43. The method of claim 31, wherein a communication configuration includes at least one component relating to a third layer or a fourth layer, of the transmission layers, determined based at least in part on the orthogonality relationship to a first layer or a second layer of the transmission layers.

44. The method of claim 31, wherein a communication configuration includes a plurality of components compressed based at least in part on wideband amplitude feedback relating to a third layer or a fourth layer of the transmission layers.

45. The method of claim 31, wherein a communication configuration includes a plurality of components determined based at least in part on a smallest wideband amplitude.

46. The method of claim 31, wherein a communication configuration includes a phase compression of a layer, of the transmission layers, selected based at least in part on a Euclidian distance determination.

47. The method of claim 31, wherein a communication configuration includes a plurality of components determined based at least in part on a stored priority rule.

48. The method of claim 31, wherein the layer power feedback information identifies relative powers of two or more layers of the transmission layers.

49. The method of claim 31, wherein a communication configuration includes a layer power adjustment determined based at least in part on an Eigen value for a layer of the transmission layers.

50. The method of claim 31, wherein a communication configuration is determined based at least in part on a layer amplitude for a layer of the transmission layers.

51. The method of claim 31, wherein a frequency coefficient is excluded from reporting for a second or higher layer of the transmission layers.

52. The method of claim 51, wherein the frequency coefficient is associated with a low-priority portion of the reporting and dropped based at least in part on a size of a channel state information reporting resource.

53. An apparatus, comprising:
  means for receiving configuration information indicating that the apparatus is to compress a precoding matrix indicator in connection with channel state information reporting,
    wherein the precoding matrix indicator is to be compressed based at least in part on a quantization dependency between transmission layers or an orthogonality relationship between the transmission layers,
    wherein the configuration information is associated with a type II, rank 3 or higher codebook for multiple input multiple output (MIMO) configuration; and
  means for transmitting, to a base station, the compressed precoding matrix indicator and layer power feedback information to the base station based at least in part on receiving the configuration information.

54. An apparatus, comprising:
a memory; and
one or more processors, coupled to the memory, configured to:
  receive a compressed precoding matrix indicator and layer power feedback information from a user equipment;
  decompress the compressed precoding matrix indicator to recover a precoding matrix indicator,
    wherein the compressed precoding matrix indicator is decompressed based at least in part on a quantization dependency between transmission layers or an orthogonality relationship between the transmission layers; and
  communicate with the user equipment based at least in part on the precoding matrix indicator.

55. An apparatus, comprising:
a memory; and
one or more processors, coupled to the memory, configured to:
  receive configuration information indicating that the apparatus is to compress a precoding matrix indicator in connection with channel state information reporting,
    wherein the precoding matrix indicator is to be compressed based at least in part on a quantization dependency between transmission layers or an orthogonality relationship between the transmission layers,
    wherein the configuration information is associated with a type II, rank 3 or higher codebook for multiple input multiple output (MIMO) configuration; and
  transmit, to a base station, the compressed precoding matrix indicator and layer power feedback information to the base station based at least in part on receiving the configuration information.

* * * * *